| (12) | United States Patent | (10) Patent No.: | US 8,794,131 B2 |
|---|---|---|---|
| | Lai et al. | (45) Date of Patent: | Aug. 5, 2014 |

(54) GRILL WITH IMPROVED-CONFIGURATION GREASE COLLECTING BOX

(75) Inventors: Qisheng Lai, Fujian (CN); Youming Yang, Fujian (CN)

(73) Assignee: Tsann Kuen (China) Enterprise Co., Ltd., Xiamen, Fujiang (CN)

( * ) Notice: Subject to any disclaimer, the term of this patent is extended or adjusted under 35 U.S.C. 154(b) by 1238 days.

(21) Appl. No.: 12/147,838

(22) Filed: Jun. 27, 2008

(65) Prior Publication Data

US 2009/0032009 A1 Feb. 5, 2009

(30) Foreign Application Priority Data

Jun. 27, 2007 (CN) .................... 2007 2 0007513 U

(51) Int. Cl.
  *A47J 37/00* (2006.01)
  *A47J 37/07* (2006.01)
  *A47J 37/06* (2006.01)

(52) U.S. Cl.
  CPC .......... *A47J 37/0709* (2013.01); *A47J 37/0676* (2013.01)
  USPC ........ 99/446; 219/455.11; 219/386; 219/533; 99/444; 99/400; 99/425; 99/422

(58) Field of Classification Search
  USPC ........ 126/1 R, 30, 339, 51; 99/446, 375, 400, 99/444, 422, 425; 220/23.2, 23.89, 259.5, 220/477, 482, 534, 543, 544; 219/455.11, 219/386, 533
  See application file for complete search history.

(56) References Cited

U.S. PATENT DOCUMENTS

| 2,899,888 | A | * | 8/1959 | Koci | 99/331 |
|---|---|---|---|---|---|
| 3,277,881 | A | * | 10/1966 | Bruns | 126/40 |
| 3,496,704 | A | * | 2/1970 | Bandlow | 96/138 |
| 3,533,363 | A | * | 10/1970 | Reiss | 108/153.1 |
| 3,942,630 | A | * | 3/1976 | Phillips | 206/1.5 |
| 5,649,445 | A | * | 7/1997 | Lavoie et al. | 72/413 |
| 5,945,024 | A | * | 8/1999 | Fukunaga et al. | 219/757 |
| 6,038,965 | A | * | 3/2000 | Thorndyke | 99/340 |
| 6,064,042 | A | * | 5/2000 | Glucksman et al. | 219/452.13 |
| 6,262,399 | B1 | * | 7/2001 | Lau et al. | 219/450.1 |
| 6,375,235 | B1 | * | 4/2002 | Mehmen | 292/128 |
| 6,415,710 | B1 | * | 7/2002 | Boone | 99/446 |
| 6,460,954 | B1 | * | 10/2002 | Bayani et al. | 312/334.44 |
| 6,463,924 | B1 | * | 10/2002 | Osterman | 126/41 R |

(Continued)

FOREIGN PATENT DOCUMENTS

JP         2001077577      *    3/2001

*Primary Examiner* — Kenneth Rinehart
*Assistant Examiner* — Sharla Magana
(74) *Attorney, Agent, or Firm* — Kening Li; Pinsent Masons LLP

(57) ABSTRACT

A grill with improved-configuration grease collecting box comprising feet, a pan mounted on the feet and a heating device on the backside of the pan, the feet form an opening to contain the grease collecting box, both sides of the opening have supports, the opening mounted a grease collecting box inside, and the grease collecting box mounted on the supports, said pan has grease outlet orifices on the top of grease collecting box. The grease collecting box of the present invention located below the pan, it does not occupy the additional space and uneasy to be turn overed by incaution, which add the security; Mounting the grease collecting box on the feet does not need any additional fitting device, and the simple configuration is advantageous to be carried; The grease collecting box being hidden in the feet make the appearance of the grill to be more aesthetic.

5 Claims, 5 Drawing Sheets

(56) References Cited

U.S. PATENT DOCUMENTS

| | | | |
|---|---|---|---|
| 6,539,839 B1* | 4/2003 | Tippmann | 99/331 |
| 6,776,085 B1* | 8/2004 | Tang | 99/375 |
| 7,086,395 B1* | 8/2006 | Li | 126/25 R |
| 7,484,506 B2* | 2/2009 | Besal | 126/299 E |
| 7,514,655 B2* | 4/2009 | Fernandez et al. | 219/524 |
| 7,872,213 B2* | 1/2011 | De Leon et al. | 219/385 |
| 2001/0018868 A1* | 9/2001 | Brady | 99/332 |

* cited by examiner

GRILL WITH IMPROVED-CONFIGURATION GREASE COLLECTING BOX

FIELD OF THE INVENTION

The present invention relates to a grill configuration, more particularly to a grill with an improved-configuration grease collecting box.

BACKGROUND OF THE INVENTION

Grills such as teppanyakis have been indispensable barbecue appliances of the outings for people. Usually these grills are used in cooking liquid-containing food such as meats. During the grilling, much grease is produced that must be drained out of the pan or else it will affect the taste of the food. Usually the existing grills arrange the grease outlet orifice in the front flange, and set a grease collecting box below the pan to gather the grease from the grease outlet orifice. In this art, the grease collecting box is detached from the pan, needs additional space and is easily overturned.

SUMMARY OF THE INVENTION

The present invention provides a grill with an improved-configuration grease collecting box. The primary objective is to obviate the disadvantage and limitations of the prior art, e.g. unreasonable structure, occupying too much space, and being easily overturned.

The above and other objects of the invention are achieved by providing a grill with an improved-configuration grease collecting box comprising feet, a pan mounted on the feet and a heating device on the backside of the pan. The feet form an opening to contain the grease collecting box. Both sides of the opening have supports, the opening mounted a grease collecting box inside, and the grease collecting box mounted on the supports, said pan has grease collecting outlet orifices on the top of grease collecting box.

The above-mentioned grill with an improved-configuration grease collecting box, wherein the feet comprising two columns and a baffle board connected between the upper part of the two feet, a support board connected between the lower part of the two feet, said opening for containing the grease collecting box formed between the two columns, the baffle board and the support board.

The inner side of the two columns form a protruding part which extends down towards the bottom of the pan to support the pan, said supporting part of the grease collecting box formed in the opposite sides of the two protruding parts.

Furthermore, the inside top of the protruding part formed a block wall to prevent the grease collecting box from overingoing.

The two sides of said grease collecting box form a flange spanning on the said supporting part.

Still more, the lower part of the flanges of the two sides of the grease collecting box have emboss, the emboss clipped in the innerside of the said supporting part.

Moreover, the two terminals of the outside wall of the grease collecting box form a chimb which can cover the said opening together with the outside wall.

The top fringe of the outside wall of the grease collecting box forms an extending out handle part.

The pan is limited by a pair of relative-longer sides and a pair of relative-short sides, the latter mounted on said feet.

There are two feet, one in the left and the other in the right, said grease collecting box mounted on one of the two feet, and the other foot has a temperature control device of the said heating device.

By the above-mentioned description of the configuration, the present invention has advantages as follows compared with the prior art: First, the grease collecting box located below the pan does not occupy additional space and is not easily overturned by incaution, which adds security. Second, mounting the grease collecting box on the feet does not require the need for any additional fitting device, and the simple configuration is advantageous for carrying. Third, the grease collecting box being hid in the feet makes the appearance of the grill more aesthetic.

DETAILED DESCRIPTION OF THE PREFERRED EMBODIMENT

The preferred embodiment of the invention will become apparent from the following detailed description with appropriate reference to the accompanying drawings.

Figure 1:
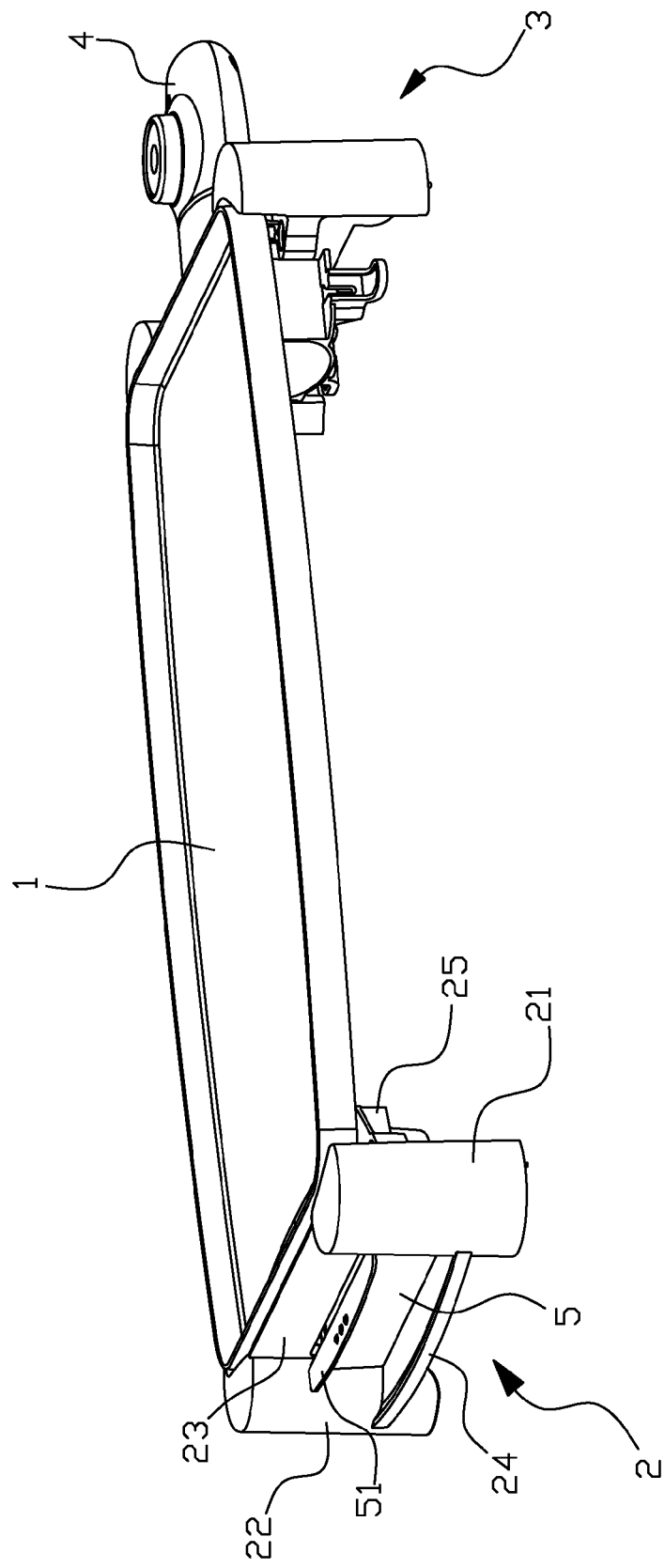
FIG. 1 is a perspective view of the present invention.
Figure 2:
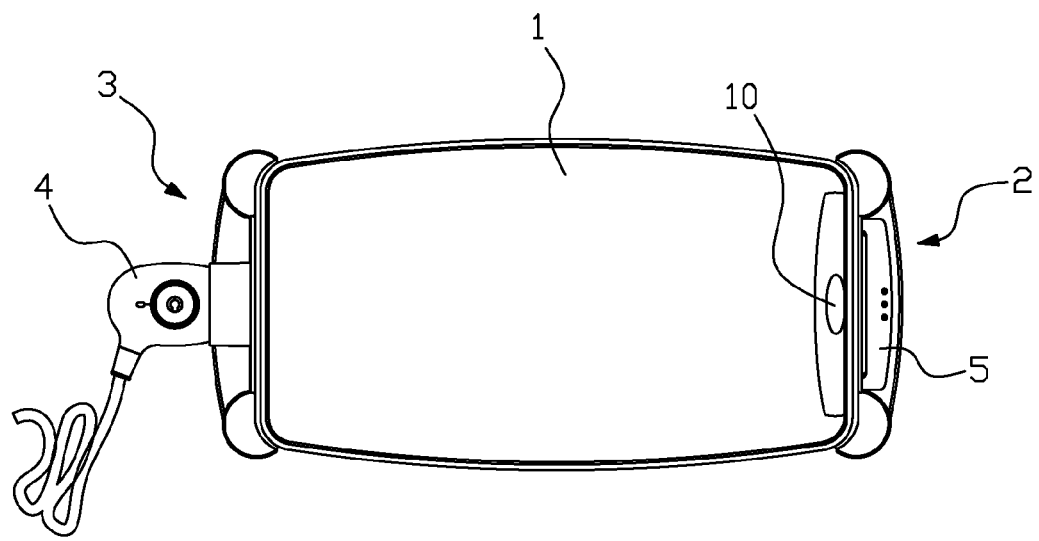
FIG. 2 is a top view of the present invention.

Referring to FIG. 1 and FIG. 2, the main configuration of the grill with improved-configuration grease collecting box provided in this embodiment comprising two feet 2, 3 arranged in the left and right side respectively, a pan 1 spaned on the feet 2, 3 and a heating device mounted on the backside of the pan 1 which is an electric heating tube and not shown in the figures. Wherein the foot 2 containing a grease collecting box 5, the grease collecting box 5 has an opening on the top, the foot 3 having a temperature controlling device 4 of the said heating device for the temperature adjusting, this part is a mature art and does not tend to be detailed described here. It is worth mentioning that the pan 1 is limited by a pair of relative-longer sides and a pair of relative-short sides, the latter mounted on said feet 2, 3.

Figure 3:
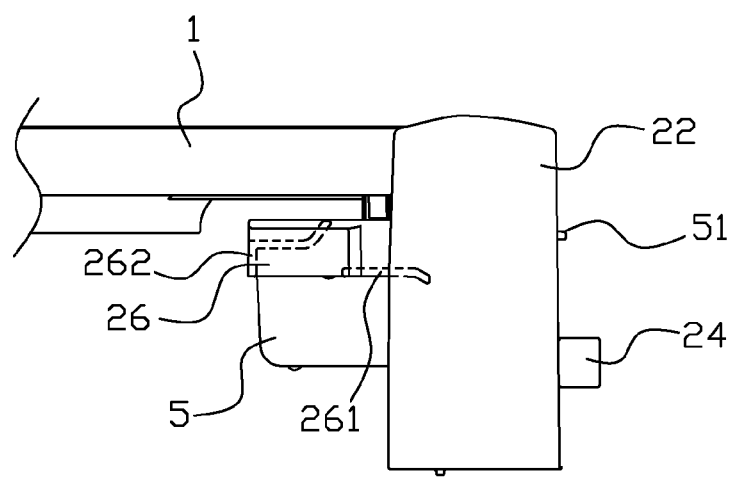
FIG. 3 is a front view of the present invention which shows only half of the grease collecting box.
Figure 4:
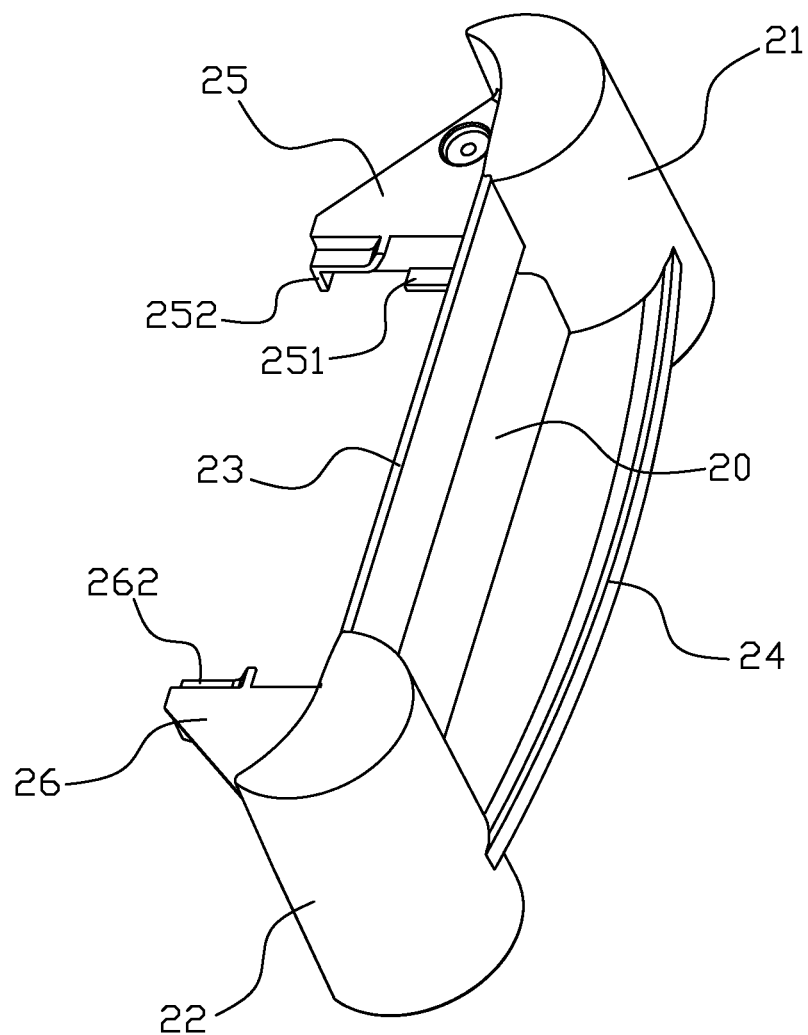
FIG. 4 is a perspective view of the feet containing the grease collecting box of the present invention.

Referring to FIG. 4, foot 2 includes two columns 21, 22, a baffle board 23 connecting to the upper parts and a supporting board 24 connecting to the lower parts of the two columns, the space between the columns 21, 22, baffle board 23 and supporting board 24 forms an opening 20 for containing the grease collecting box 5. And referring to FIG. 3, FIG. 4 and FIG. 5, the columns 21, 22 form the protruding parts 25, 26 which extends below the pan 1 to support the pan 1, foot 3 has the same configuration to support the pan 1 together with foot 2. The opposite sides of the protruding parts 25, 26 form supporting parts 251, 261 which used to support the grease collecting box 5, and referring to FIG. 6 and FIG. 7, the two sides of the grease collecting box 5 form flanges 52, 53 which spans on the said supporting parts 251, 261, the flanges 52, 53 have embosses 521, 531 in the bottom which located in the inner sides of the said supporting parts 251, 261 to prevent the grease collecting box 5 from sliding out in the normal using. Referring to FIG. 2, said pan 1 has an orifice 10 on the top of the grease collecting box 5, the grease produced during cookings will flow into the grease collecting box 5 through the orifice 10.

Figure 5:
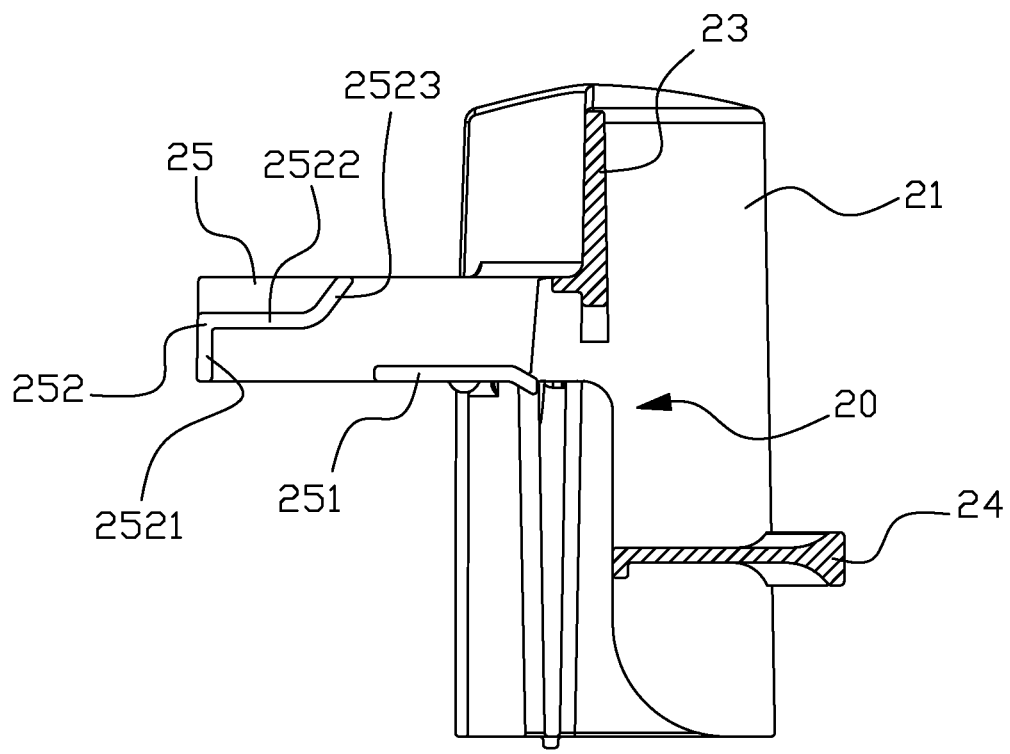
FIG. 5 is a sectional view of the feet containing the grease collecting box of the present invention.

Referring to FIG. 4 and FIG. 5, the inner side of the protruding part 25 has a baffle wall 252 to prevent the grease collecting box from excess ingoing. The baffle wall 252 comprising a vertical part 2521, horizontal part 2522 and a bending part 2523. The protruding part 26 has baffle wall 262 also which has the same configuration as the baffle wall 252. The baffle wall 252, 262 not only can prevent the grease collecting box 5 from excess ingoing, but also can prevent the inner side of the grease collecting box 5 from tilting up. It can make the grease collecting box 5 be limited safely.

Figure 6:
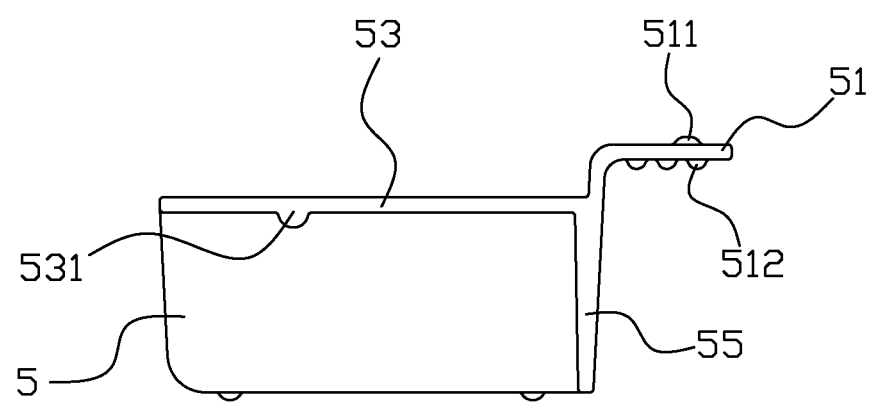
FIG. 6 is a side view of the grease collecting box of the present invention.
Figure 7:
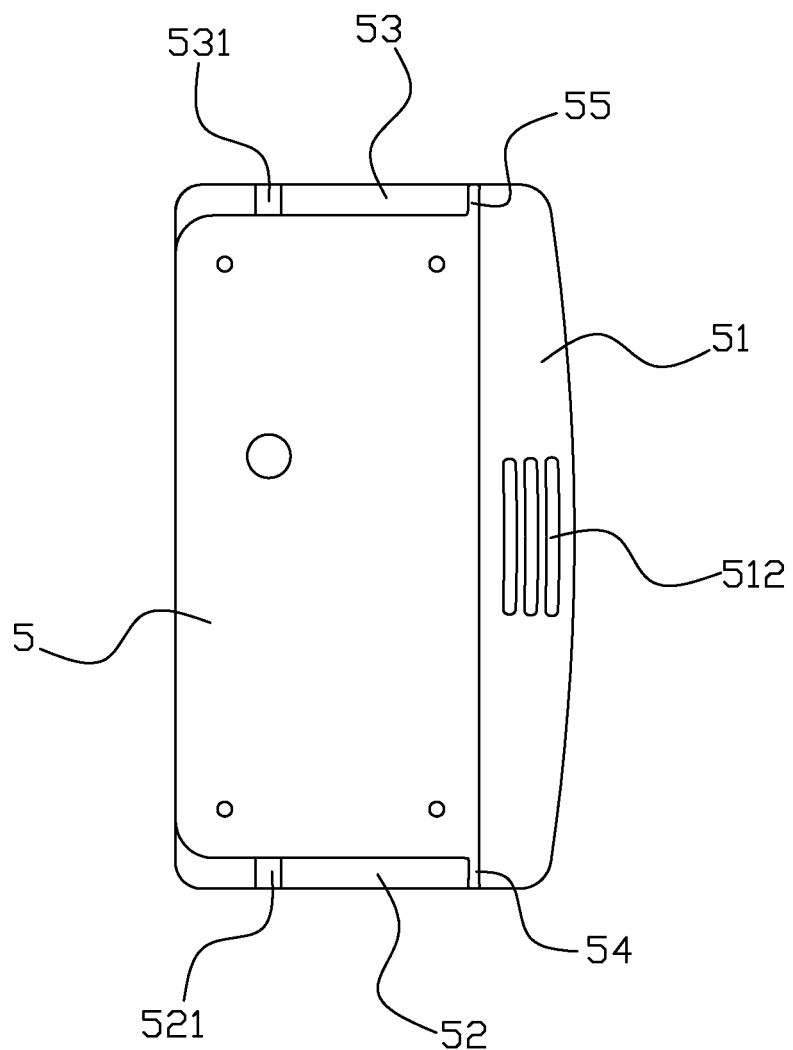
FIG. 7 is a top view of the grease collecting box of the present invention.

Referring to FIG. 1, FIG. 6 and FIG. 7, the grease collecting box 5 forms chimbs 54, 55 in the outside walls which can cover the said opening 20 together with the outside walls. The grease collecting box 5 forms an extending out handle part 51 on the top edge of the outside wall, the bottom of handle part 51 has anti-sliding bars 512, the top of handle part 51 has anti-sliding emboss 511, these configurations make that taking out the grease collecting box to clean the deposit grease collecting to be quite easy.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with detailed description, but rather by the claims appended hereto.

What is claimed is:

1. A grill with a grease collecting box, the grill comprising a first foot and a second foot, a pan mounted on the feet and a heating device on a backside of the pan, wherein the feet form an opening to contain the grease collecting box, wherein said pan comprises a grease outlet orifice on top of grease collecting box, wherein each of the feet comprises two columns each having an upper part and a lower part, and a baffle board connecting the upper parts of the two columns, a support board connecting the lower parts of the two columns, wherein on the inner side of each of the two columns a protruding part is formed to support the pan, wherein on said first foot each of the protruding parts having a near-end close to the column, and a far-end away from the column, and having a side facing opposite the other protruding part; and on each of opposite sides of the two protruding parts a supporting part and a baffle wall are formed, wherein the supporting part is located on the near-end at the bottom of the opposite side to support the grease collecting box, and the baffle wall is located at the far-end to prevent the grease collecting box from over-ingoing and to prevent the grease box from tilting up, the baffle wall comprising a vertical part along the edge of the far-end, followed by a horizontal part, and a bending part bending upward, and the baffle wall and the supporting part are separated by an open space in-between, wherein each of the two sides of said grease collecting box forms a flange spanning on said supporting part, and wherein each of the flanges comprises an emboss clipped on the supporting part.

2. The grill according to claim 1, wherein the grease collecting box comprises a front wall comprising a chimb which together with the front wall covers the opening.

3. The grill according to claim 1, wherein a top fringe of the front wall of the grease collecting box forms an extended-out handle part.

4. The grill according to claim 1, wherein the pan is rectangular in shape having a pair of relatively-longer sides and a pair of relatively-short sides, the latter mounted on said feet.

5. The grill according to claim 1, wherein said grease collecting box is mounted on the first foot one of the two feet, and a temperature control device of the said heating device is mounted on the second foot.

* * * * *